United States Patent
Lierman et al.

(10) Patent No.: US 10,911,954 B2
(45) Date of Patent: Feb. 2, 2021

(54) DYNAMIC DATA PACKAGE ACCESS FOR MOBILE DEVICE

(71) Applicant: THE BOEING COMPANY, Chicago, IL (US)

(72) Inventors: Jeffrey H. Lierman, Mount Pleasant, SC (US); Brian W. Pippen, Charleston, SC (US); Robert L. Vitali, Summerville, SC (US); Mark J. Boyer, Placentia, CA (US); Paul R. Davies, Long Beach, CA (US); Brian D. Laughlin, Wichita, KS (US); Joseph Anelle, Weldon Springs, MO (US)

(73) Assignee: THE BOEING COMPANY, Chicago, IL (US)

( * ) Notice: Subject to any disclaimer, the term of this patent is extended or adjusted under 35 U.S.C. 154(b) by 159 days.

(21) Appl. No.: 15/909,065

(22) Filed: Mar. 1, 2018

(65) Prior Publication Data
US 2019/0274046 A1    Sep. 5, 2019

(51) Int. Cl.
| H04L 29/06 | (2006.01) |
| H04W 12/08 | (2009.01) |
| H04W 4/60 | (2018.01) |
| G06F 8/61 | (2018.01) |
| H04W 48/04 | (2009.01) |

(Continued)

(52) U.S. Cl.
CPC .............. *H04W 12/08* (2013.01); *G06F 8/61* (2013.01); *H04L 63/107* (2013.01); *H04L 67/34* (2013.01); *H04W 4/50* (2018.02); *H04W 4/60* (2018.02); *H04W 4/80* (2018.02); *H04W 8/245* (2013.01); *H04W 48/04* (2013.01); *H04L 67/12* (2013.01); *H04W 12/06* (2013.01)

(58) Field of Classification Search
CPC ...... H04W 12/08; H04W 12/06; H04L 63/107
See application file for complete search history.

(56) References Cited

U.S. PATENT DOCUMENTS

| 8,224,886 B2 * | 7/2012 | Visalli | ...... H04L 67/26 709/202 |
| 8,311,518 B2 * | 11/2012 | Fiorini | ...... H04L 67/34 455/414.1 |

(Continued)

FOREIGN PATENT DOCUMENTS

WO     2016044119 A1    3/2016

OTHER PUBLICATIONS

Communication pursuant to Article 94(3) EPC for Application No. 16156561.3 dated Mar. 27, 2020, 8 pgs.

(Continued)

*Primary Examiner* — David Garcia Cervetti
(74) *Attorney, Agent, or Firm* — Moore IP Law (57) ABSTRACT

A device includes a processor configured to detect that a mobile device is within a coverage area of a wireless transceiver. The processor is also configured to select, based at least in part on a mobile device identifier of the mobile device, a data package identifier from a plurality of data package identifiers. The device also includes the wireless transceiver. The wireless transceiver is configured to transmit a command instructing the mobile device to access a data package corresponding to the selected data packet identifier. The command includes authorization data indicating that the processor is a trusted source.

20 Claims, 7 Drawing Sheets

(51) Int. Cl.
*H04W 8/24* (2009.01)
*H04W 4/80* (2018.01)
*H04L 29/08* (2006.01)
*H04W 4/50* (2018.01)
*H04W 12/06* (2009.01)

(56) References Cited

U.S. PATENT DOCUMENTS

| | | | | |
|---|---|---|---|---|
| 8,356,251 | B2* | 1/2013 | Strober | H04L 65/60 715/740 |
| 8,635,316 | B2 | 1/2014 | Barnhill, Jr. | |
| 9,489,832 | B2* | 11/2016 | Nair | G05B 19/418 |
| 10,114,670 | B2* | 10/2018 | Glatfelter | G06F 9/4812 |
| 10,299,342 | B1* | 5/2019 | Reddy | H05B 45/50 |
| 2004/0142744 | A1* | 7/2004 | Atkinson | H04L 63/0428 463/29 |
| 2004/0205151 | A1* | 10/2004 | Sprigg | H04L 67/30 709/217 |
| 2005/0075115 | A1* | 4/2005 | Corneille | G06F 8/61 455/456.3 |
| 2006/0035707 | A1* | 2/2006 | Nguyen | G07F 17/323 463/29 |
| 2006/0089542 | A1* | 4/2006 | Sands | A61B 5/0022 600/300 |
| 2006/0234698 | A1* | 10/2006 | Fok | H04L 43/00 455/425 |
| 2006/0278694 | A1* | 12/2006 | Jha et al. | H04W 12/1208 235/379 |
| 2008/0064340 | A1* | 3/2008 | Whatmough | G06F 16/958 455/67.11 |
| 2008/0076572 | A1* | 3/2008 | Nguyen | G07F 17/3269 463/42 |
| 2008/0215725 | A1* | 9/2008 | Backer | G06Q 30/0205 709/224 |
| 2009/0017789 | A1* | 1/2009 | Thomas | H04W 12/06 455/406 |
| 2009/0019167 | A1* | 1/2009 | Taaghol | G06F 9/4416 709/228 |
| 2009/0079537 | A1* | 3/2009 | Seitz | G05B 19/406 340/5.2 |
| 2009/0132698 | A1* | 5/2009 | Barnhill, Jr. | H04L 41/0803 709/224 |
| 2009/0156165 | A1* | 6/2009 | Raghothaman | H04W 4/16 455/411 |
| 2009/0184924 | A1* | 7/2009 | Uchida | H04N 5/775 345/157 |
| 2009/0280792 | A1* | 11/2009 | Leblanc | H04L 67/26 455/418 |
| 2010/0262467 | A1* | 10/2010 | Barnhill, Jr. | H04L 41/12 709/223 |
| 2011/0082882 | A1* | 4/2011 | Denison | G07C 9/00571 707/770 |
| 2012/0191844 | A1* | 7/2012 | Boyns | G06Q 30/0282 709/224 |
| 2012/0272148 | A1 | 10/2012 | Strober | |
| 2013/0006869 | A1* | 1/2013 | Grab | G06F 21/10 705/51 |
| 2013/0024542 | A1* | 1/2013 | Keller | G05B 19/0428 709/217 |
| 2013/0074163 | A1* | 3/2013 | Murakami | G06F 21/10 726/4 |
| 2014/0143137 | A1* | 5/2014 | Carlson | G06Q 20/18 705/39 |
| 2014/0148205 | A1* | 5/2014 | Grinshpun | H04L 67/146 455/466 |
| 2014/0214655 | A1* | 7/2014 | Smith | G06Q 20/322 705/39 |
| 2014/0237462 | A1* | 8/2014 | Zheng | G06F 8/62 717/170 |
| 2014/0282257 | A1* | 9/2014 | Nixon | G06F 3/04842 715/835 |
| 2015/0029120 | A1* | 1/2015 | Sieckmann | H04W 4/80 345/173 |
| 2015/0109967 | A1* | 4/2015 | Hogan | H04M 15/44 370/259 |
| 2015/0304440 | A1* | 10/2015 | Zheng | H04L 67/26 717/177 |
| 2015/0312361 | A1* | 10/2015 | Seo | H04W 48/00 370/329 |
| 2016/0132046 | A1* | 5/2016 | Beoughter | G05B 19/4184 700/17 |
| 2016/0246617 | A1* | 8/2016 | Watsen | H04L 41/0886 |
| 2016/0274558 | A1* | 9/2016 | Strohmenger | G05B 19/0428 |
| 2016/0285953 | A1* | 9/2016 | Cao | H04L 29/08072 |
| 2016/0316419 | A1* | 10/2016 | Shyamalan | H04W 8/005 |
| 2017/0208436 | A1* | 7/2017 | Caine | H04L 67/306 |
| 2017/0220330 | A1* | 8/2017 | Soini | G06F 8/61 |
| 2017/0317879 | A1* | 11/2017 | Wei | G06F 13/385 |
| 2018/0024847 | A1* | 1/2018 | Campbell | H04L 67/12 715/708 |
| 2018/0025304 | A1* | 1/2018 | Fisher | G06Q 10/20 726/4 |
| 2018/0107178 | A1* | 4/2018 | Nixon | H04L 67/10 |
| 2018/0262891 | A1* | 9/2018 | Wu | H04W 4/00 |
| 2018/0293823 | A1* | 10/2018 | Gillot | G07C 9/27 |
| 2019/0236873 | A1* | 8/2019 | Estill | G07C 9/00309 |
| 2019/0334893 | A1* | 10/2019 | Chen | H04W 88/08 |
| 2020/0030938 | A1* | 1/2020 | Knudson | B24B 49/14 |
| 2020/0057654 | A1* | 2/2020 | Yang | G06F 8/65 |

OTHER PUBLICATIONS

"OMA Device Management Protocol; OMA-TS-DM_Protocol-V1_3-20160524-A", OMA-TS-DM_PROTOCOL-V1_3-20160524-A, Open Mobile Alliance (OMA), 4330 La Jolla Village Dr., Suite 110San Diego, CA 92122; USA, No. 1.3 May 24, 2016, pp. 1-60, XP064189238, Retrieved from the Internet: URL:ftp/Public_documents/DM/DM-DM13/Permanent_documents/ [retrieved on Jun. 7, 2016].

Communication pursuant to Article 94(3) EPC for Application No. 19156561.3 dated Sep. 3, 2020, pp. 1-10.

European Search Report for Application No. EP 19156561 dated Apr. 26, 2019, 2 pgs.

* cited by examiner

DYNAMIC DATA PACKAGE ACCESS FOR MOBILE DEVICE

FIELD OF THE DISCLOSURE

The present disclosure is related to a mobile device that accesses a data package.

BACKGROUND

In a manufacturing environment, different devices are interconnected and exchange data via a network (e.g., an Internet of Things (TOT) network). In some scenarios, a mobile device entering the manufacturing environment is not equipped with assets (applications, files, multimedia, etc.) to perform different tasks. Thus, the assets have to be manually installed at the mobile device after the mobile device enters the manufacturing environment, if the mobile device is to perform tasks associated with the assets. To illustrate, an end-user of the mobile device can navigate an asset installation repository (e.g., an application store) to download the assets used to perform the tasks. However, the end-user would need foreknowledge of the assets and the location of the assets in the asset installation repository.

SUMMARY

According to one implementation of the present disclosure, a device includes a wireless transceiver and a processor configured to detect that a mobile device is within a coverage area of the wireless transceiver. The processor is also configured to select, based at least in part on a mobile device identifier of the mobile device, a data package identifier from a plurality of data package identifiers. The wireless transceiver is configured to transmit a command instructing the mobile device to access a data package corresponding to the selected data packet identifier. The command includes authorization data indicating that the processor is a trusted source.

According to another implementation of the present disclosure, a method includes transmitting, from a mobile device to an access point, a mobile device identifier of the mobile device. The method also includes receiving, at the mobile device from the access point, a command indicating a data package identifier. The data package identifier is selected based on the mobile device identifier, and the command includes authorization data. The method also includes determining, based on the authorization data, that the access point is a trusted source. The method further includes accessing a data package corresponding to the data package identifier in response to the determination.

According to another implementation of the present disclosure, a computer-readable storage device stores instructions that, when executed by a processor, cause the processor to perform operations including detecting that a mobile device is within a coverage area of a wireless transceiver. The operations also include selecting, based at least in part on a mobile device identifier of the mobile device, a data package identifier from a plurality of data package identifiers. The operations further include initiating transmission of a command instructing the mobile device to access a data package corresponding to the selected data packet identifier. The command includes authorization data indicating that the processor is a trusted source.

One advantage of the above-described implementation includes efficient data package delivery to an end-user of a mobile device entering into an environment. For example, because an access point transmits a data package identifier to the mobile device in response to receiving a mobile device identifier, the mobile device can identify the data package (used to perform tasks) without an end-user having to manually access a data package repository. Additionally, the end-user of the mobile device does not need foreknowledge of the data package and the location of the data package in order for the mobile device to receive the data package. As a result, the data package is more efficiently delivered to the mobile device (compared to a manual process). Additionally, the features, functions, and advantages that have been described can be achieved independently in various implementations or may be combined in yet other implementations, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein enable a mobile device, upon entering an environment, to dynamically access remote data packages that are used to configure the mobile device according to the environment. As a non-limiting example, the mobile device enters into an information-rich manufacturing environment. Upon entering the manufacturing environment, the mobile device lacks assets (e.g., applications, files, multi-media, etc.) to perform tasks within the manufacturing environment. To obtain the assets (or data packages associated with the assets), the mobile device transmits a mobile device identifier to an access point associated with the manufacturing environment. According to one implementation, the mobile device identifier is transmitted in a beacon using a low-energy transmission protocol (e.g., a BLUETOOTH® communication protocol). BLUETOOTH® is a registered trademark owned by BLUETOOTH SIG, INC., a Delaware corporation. Based on the mobile device identifier, the access point identifies at least one data package for the mobile device to access from a server. For example, the access point selects a data package that, upon reception at the mobile device, enables the mobile device to perform the tasks. The access point transmits a data package identifier (identifying the data package) to the mobile device. Upon receiving the mobile device identifier, in some instances, the access point verifies that a user associated with the mobile device has a proper authorization (e.g., security clearance) to receive the remote data packages prior to sending the data package identifier to the mobile device. According to some implementation, the access point verifies a list of credentials as part of a data package request to prevent unauthorized data transmission. The list of credentials may include employee identification, certifications, an indication of role responsibility, a job assignment, etc.

Upon reception of the data package identifier, the mobile device transmits a data package request to the server to receive the data package indicated by the data package identifier. In some scenarios, the data package request includes the data package identifier. Upon reception of the data package request, the server transmits the data package to the mobile device, and the mobile device uses information in the data package to perform the tasks. As a non-limiting example, the data package can include configuration settings, and the mobile device can use the configuration settings to configure an operating system of the mobile device to perform the tasks. As another non-limiting example, the data package can include multimedia (e.g., a tutorial video associated with operating equipment in the manufacturing environment), and the mobile device can playback the content to enable the user to perform the tasks (e.g., operate the equipment).

Figure 1:
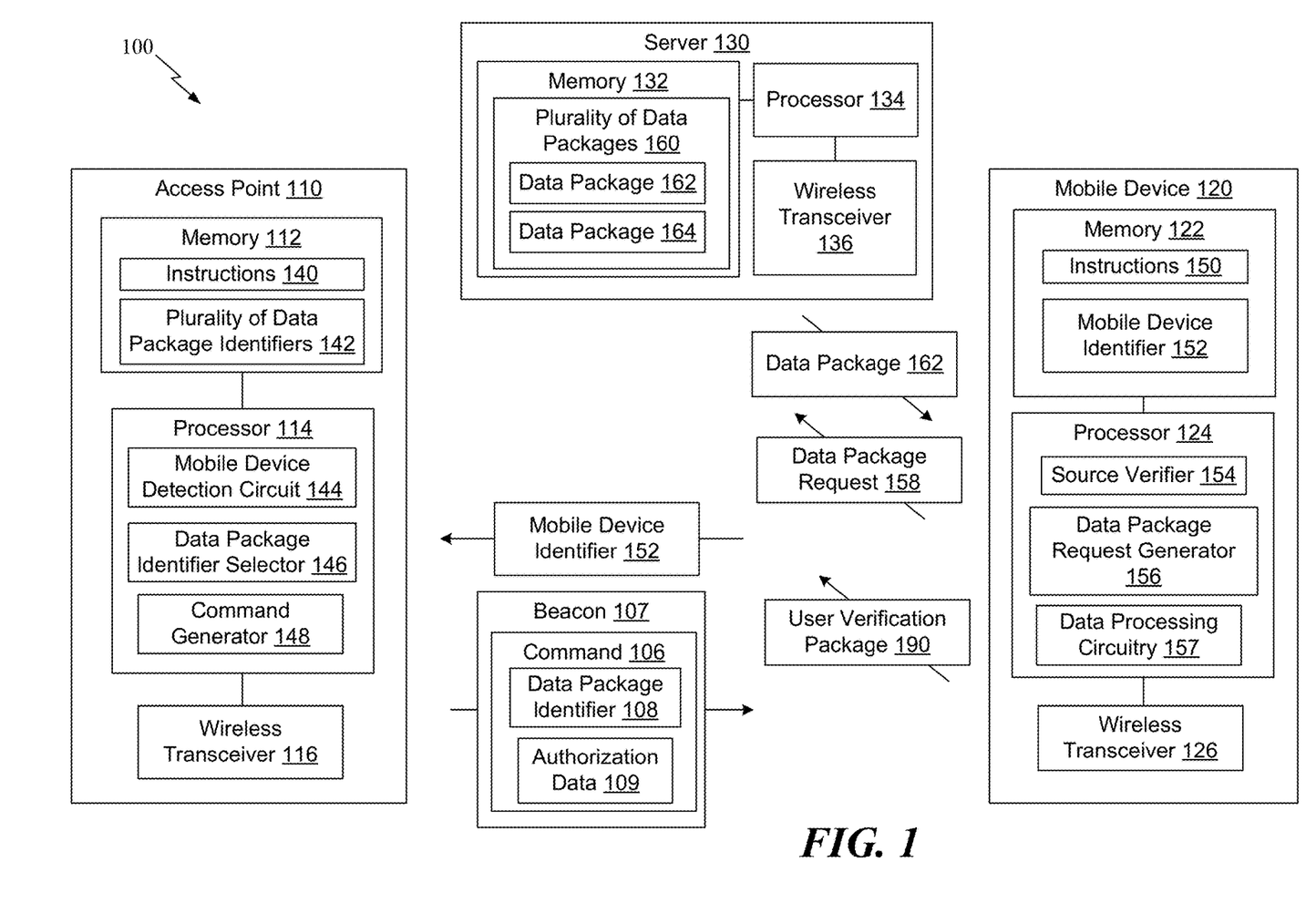
FIG. 1 is a diagram of a system that enables a mobile device to dynamically access data packets.

FIG. 1 is a diagram of a system 100 that is operable to enable data package access for a mobile device. The system 100 includes an access point 110, a mobile device 120, and a server 130. According to one implementation, the access point 110 is a beacon device. The mobile device 120 can be an augmented reality device, a virtual reality device, a mixed reality device, laptop, a smart phone, a smart watch, a tablet, or any other mobile device. The access point 110, the mobile device 120, and the server 130 are configured to communicate using a wireless technology. According to one implementation, the access point 110, the mobile device 120, and the server 130 communicate according to an Institute of Electrical and Electronics Engineers (IEEE) 802.11 protocol. According to another implementation, the access point 110, the mobile device 120, and the server 130 communicate according to a low-energy communication protocol (e.g., a BLUETOOTH® communication protocol). According to another implementation, the access point 110, the mobile device 120, and the server 130 communicate according to a Near Field Communication (NFC) protocol.

Figure 2:
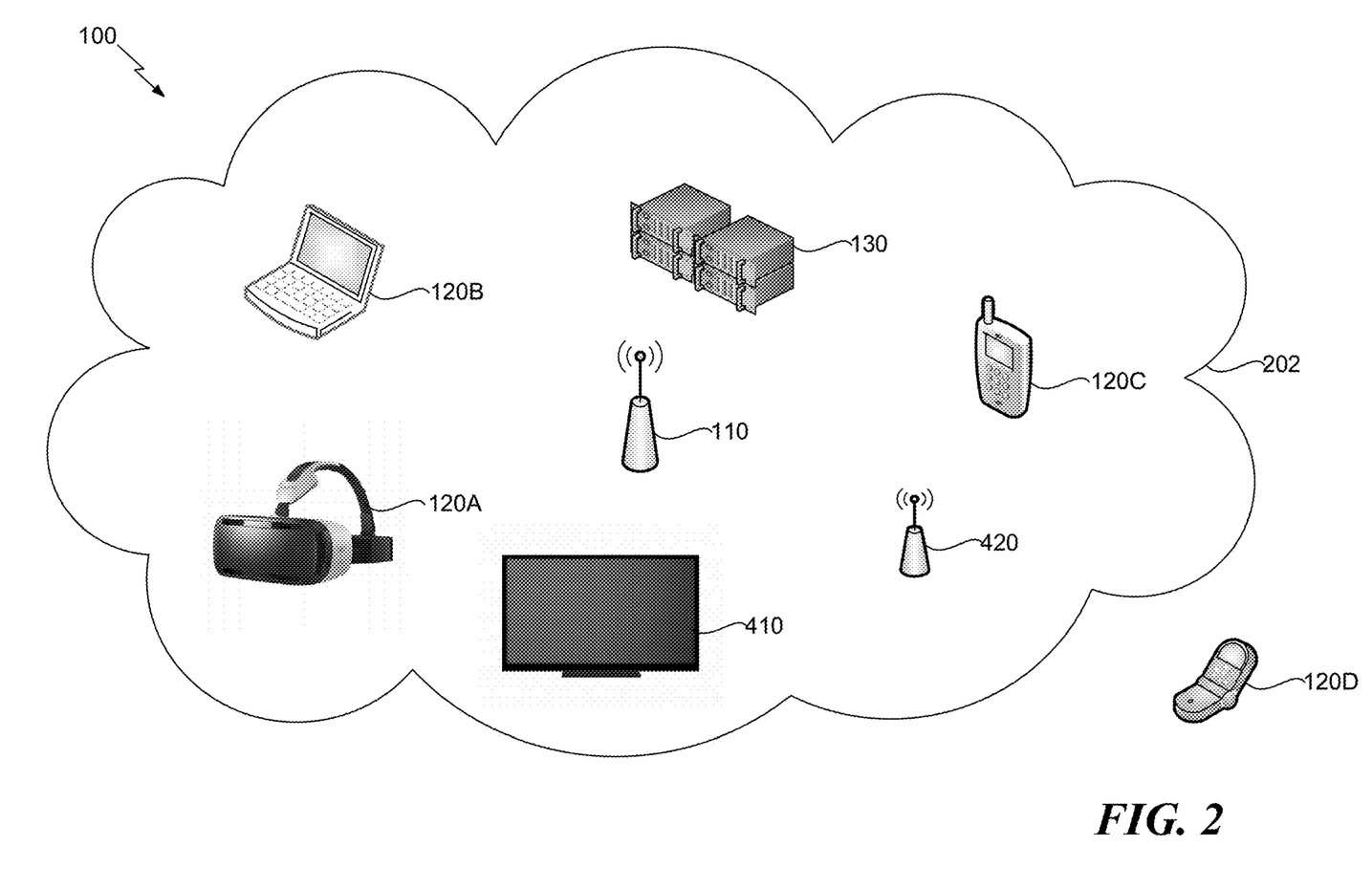
FIG. 2 is a diagram of an environment that includes an access point and multiple mobile devices.

According to one implementation, the mobile device 120 corresponds to a single mobile device associated with a group of mobile devices proximate to coverage area of the access point 110. For example, referring to FIG. 2, another implementation of the system 100 that is operable to enable data package access for a mobile device is shown. FIG. 2 illustrates four examples of the mobile device 120, including a mobile device 120A, a mobile device 120B, a mobile device 120C, and a mobile device 120D. The access point 110 has a coverage area 202. The coverage area 202 represents a range that the wireless transceiver 116 (of the access point 110) is capable of transmitting and receiving data. According to FIG. 2, the mobile device 120A is within the coverage area 202 of the access point 110, the mobile device 120B is within the coverage area 202 of the access point 110, and the mobile device 120C is within the coverage area 202 of the access point 110. Thus, the access point 110 is operable to transmit messages to (and receive messages from) the mobile devices 120A, 120B, 120C.

According to FIG. 2, the mobile device 120D is outside the coverage area 202. Thus, the access point 110 is not operable to transmit messages to (and receive messages from) the mobile device 120D. The coverage area 202 also includes a media device 410 and a second device 420. According to one implementation, the second device 420 includes a server, such as the server 130. According to another implementation, the second device 420 includes a cloud-based device. Operations performed by the media device 410 and the second device 420 are described in greater detail with respect to FIG. 4.

According to one implementation, the coverage area 202 corresponds to a manufacturing factory that supports different devices (e.g., different mobile devices). Each of the mobile devices 120A, 120B, 120C within the coverage area 202 (and the server 130) can exchange data. Thus, in one implementation, the coverage area 202 corresponds to an internet-of-things (TOT) network that enables the mobile devices 120A, 120B, 120C and the server 130 to exchange data.

However, because each mobile device 120A, 120B, 120C within the coverage area 202 is of a different type (e.g., different model), each mobile device 120A, 120B, 120C is associated with a different configuration. To illustrate, the mobile device 120A is an augmented reality device, the mobile device 120B is a laptop, and the mobile device 120C is a personal digital assistant (PDA). Thus, the mobile device 120A is associated with a first configuration related to augmented reality devices, the mobile device 120B is associated with a second configuration related to laptops, and the mobile device 120C is associated with a third configuration related to PDAs. Because each mobile device 120A, 120B, 120C is associated with a different configuration, different operating systems can be installed on each mobile device 120A, 120B, 120C or different versions of an operating system can be installed on each mobile device 120A, 120B, 120C. Additionally, each mobile device 120A, 120B, 120C can have different hardware specifications or different software specifications. The techniques described herein enable each mobile device 120A, 120B, 120C to access a unique data package (related to the corresponding configuration) upon entering the coverage area 202.

Referring back to FIG. 1, the mobile device 120 includes a memory 122, a processor 124 coupled to the memory 122, and a wireless transceiver 126 coupled to the processor 124. The memory 122 is a computer-readable storage device that stores instructions 150 that are executable to cause the processor 124 to perform operations. The processor 124 includes a source verifier 154, a data package request generator 156, and data processing circuitry 157.

Upon entering the coverage area 202, the mobile device 120 is configured to transmit a mobile device identifier 152 to the access point 110. For example, the mobile device identifier 152 is stored in the memory 122 of the mobile device 120. The mobile device identifier 152 includes identity information associated with the mobile device 120. As a non-limiting example, the mobile device identifier 152 includes a product key of the mobile device 120, a credential key of an end-user associated with the mobile device 120, a key representing the end-user has fulfilled particular prerequisites (e.g., safety prerequisites) to work in the environment, etc. The processor 124 is configured to retrieve the mobile device identifier 152 from the memory 122, and the wireless transceiver 126 is configured to transmit the mobile device identifier 152 to the access point 110.

The access point 110 includes a memory 112, a processor 114 coupled to the memory 112, and a wireless transceiver 116 coupled to the processor 114. The memory 112 is a computer-readable storage device that stores instructions 140 that are executable to cause the processor 114 to perform operations. The processor 114 includes a mobile device detection circuit 144, a data package identifier selector 146, and a command generator 148.

The access point 110 is configured to detect that the mobile device 120 is within the coverage area 202. For example, the wireless transceiver 116 of the access point 110 is configured to receive the mobile device identifier 152 from the mobile device 120. The mobile device detection circuit 144 is configured to process (e.g., decode, identify, etc.) the mobile device identifier 152 to determine that the mobile device 120 is within the coverage area 202. As a non-limiting example, the mobile device detection circuit 144 identifies the product key of the mobile device identifier 152 and determines that the mobile device 120 is within the coverage area 202 in response to identifying the product key. According to some implementations, the mobile device 120 sends a user verification package 190 to the server 130 upon detecting the access point 110. The user verification package includes user information that is used to authenticate the user of the mobile device 120.

In response to detection of the mobile device 120, the data package identifier selector 146 is configured to select a data package identifier 108 based at least in part on the mobile device identifier 152. To illustrate, the memory 112 of the access point 110 stores a plurality of data package identifiers 142. According to one implementation, each data package identifier of the plurality of data package identifiers 142 is associated with a different mobile device. To illustrate, the data package identifier 108 is associated with the mobile device 120, a different data package identifier (not shown) of the plurality of data package identifiers 142 is associated with the mobile device 120B, and a different data package identifier (not shown) of the plurality of data package identifiers 142 is associated with the mobile device 120C. The data package identifier 108 indicates a data package (stored at the server 130) designated for the mobile device 120. As described below, the mobile device 120 uses the data package (indicated by the data package identifier 108) for different operations (e.g., configuration operations, installation operations, content-based operations, etc.).

According to one implementation, the data package identifier 108 is selected based at least in part on a determination that a user associated with the mobile device 120 has a level of security clearance that satisfies a security clearance threshold associated with the data package. As a non-limiting example, the data package (indicated by the data package identifier 108) can include sensitive information that is available to personnel with a high security clearance. Based on the mobile device identifier 152, the data package identifier selector 146 can determine whether the user associated with the mobile device 120 has the level of security clearance that satisfies the security clearance threshold.

According to another implementation, the data package (indicated by the data package identifier 108) is associated with an item (e.g., a manufacturing item, a software item, a hardware item, tools, etc.). The data package identifier selector 146 selects the data package identifier 108 based on at least one of two criteria. For example, in response to a determination that item catalogue data indicates that the item is checked out to a user that is associated with the mobile device 120, the data package identifier selector 146 selects the data package identifier 108. To illustrate, if the item catalogue data indicates that a mechanic using the mobile device 120 checked out a particular tool (e.g., a wrench), the data package identifier selector 146 selects the data package identifier 108 because the data package identifier 108 corresponds to a data package associated with the particular tool. As another example, in response to a determination (or detection) that the item is within the coverage area 202 of the wireless transceiver 116, the data package identifier selector 146 selects the data package identifier 108.

According to another implementation, the data package identifier 108 is selected based other criteria. As a non-limiting example, the data package identifier 108 is selected in response to a determination that the data package (indicated by the data package identifier 108) is associated with a model of the mobile device 120. As another non-limiting example, the data package identifier 108 is selected based on a type of operating system installed on the mobile device 120. As another non-limiting example, the data package identifier 108 is selected based a version of the operating system installed on the mobile device 120. The data package identifier 108 can also be selected based on a hardware specification of the mobile device 120, a software specification of the mobile device 120, or both.

After the data package identifier selector 146 selects the data package identifier 108, the command generator 148 is configured to generate a command 106 that instructs the mobile device 120 to access the data package indicated by the data package identifier 108. To illustrate, the data package identifier 108 is included in the command 106. Additionally, authorization data 109 is included in the command 106. The authorization data 109 indicates that the processor 114 (or the access point 110) is a trusted source. The wireless transceiver 116 is configured to transmit the command 106 to the mobile device 120. According to one implementation, the command 106 is included in a beacon 107 that is communicated using a wireless communication protocol.

The wireless transceiver 126 is configured to receive the command 106. Upon reception of the command 106, the source verifier 154 is configured to determine whether the access point 110 is a trusted source. For example, the source verifier 154 is configured to process (e.g., decode) the authorization data 109 to determine that the access point 110 is a trusted source. In response to determining that the access point 110 is a trusted source, the data package request generator 156 is configured to access a data package 162 corresponding to the data package identifier 108. For example, the data package request generator 156 is configured to generate a data package request 158 based on the data package identifier 108. After the data package request 158 is generated, the wireless transceiver 126 is configured to send the data package request 158 to the server 130.

The server 130 includes a memory 132, a processor 134 coupled to the memory 132, and a wireless transceiver 136 coupled to the processor 134. A plurality of data packages 160 is stored in the memory 132. The plurality of data packages 160 includes a data package 162 and a data package 164. Although two data packages 162, 164 are illustrated in FIG. 1, in other implementations, the plurality of data packages 160 includes additional data packages. As a non-limiting example, the plurality of data packages 160 can include fifteen (or more) data packages. Each data package in the plurality of data packages 160 is associated with a different device, a different configuration for similar devices, a different format for similar devices, etc. As a non-limiting example, the data package 162 is associated with the mobile device 120, the data package 164 is associated with the mobile device 120B, another data package of the plurality of data packages is associated with the mobile device 120C, etc. As another non-limiting example, the processor 134 can dynamically generate the data package 162 for the mobile device 120 based on a set of parameters indicated in the data package request 158.

The wireless transceiver 136 is configured to receive the data package request 158 from the mobile device 120. Upon reception of the data package request 158, the processor 134 is configured to retrieve the data package 162 (from the memory 132) that is associated with the data package request 158. To illustrate, the processor 134 is configured to process (e.g., decode) the data package request 158 to identify the corresponding data package 162 located in the memory 132. After the processor 134 identifies the data package 162, the processor 134 retrieves the data package 162 from the memory 132 and initiates transmission of the data package 162 to the mobile device 120. The wireless transceiver 136 is configured to transmit the data package 162 to the mobile device 120.

The wireless transceiver 126 is configured to receive the data package 162 from the server 130. Upon reception of the data package 162, the data processing circuitry 157 is configured to perform operations (e.g., configuration operations, installation operations, content-based operations, etc.) at the mobile device 120 using information included in the data package 162. The operations are described using different implementations of the data package 162, as described with respect to FIGS. 3A-3C.

Figure 3A:
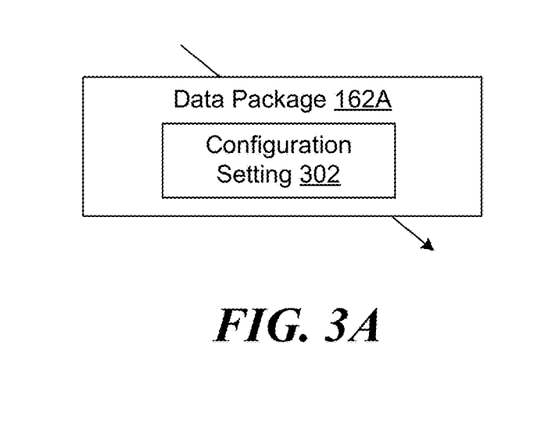
FIGS. 3A, 3B, and 3C illustrate different implementations of data packets that are dynamically accessible to a mobile device.

Referring to FIG. 3A, a particular implementation of a data package 162A is shown. The data package 162A corresponds to the data package 162 of FIG. 1. The data package 162A includes a configuration setting 302. According to one implementation, the command 106 instructs the data processing circuitry 157 to update a configuration of the mobile device 120 based on the configuration setting 302. To illustrate, upon reception of the data package 162A, the data processing circuitry 157 updates the configuration of the mobile device 120 using the configuration setting 302. The updated configuration enables the mobile device 120 to operate in an environment associated with the coverage area 202. As a non-limiting example, the updated configuration can result in activation of particular features or applications of the mobile device 120, deactivation of other particular features or applications of the mobile device 120, or both.

Figure 3B:
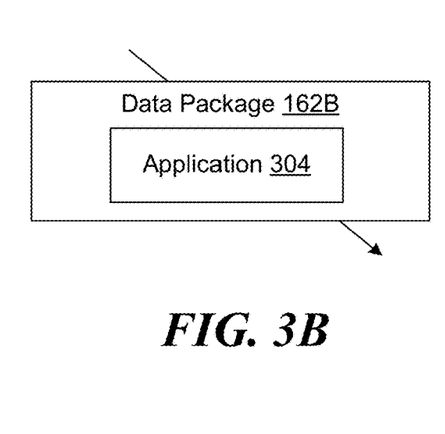

Referring to FIG. 3B, a particular implementation of a data package 162B is shown. The data package 162B corresponds to the data package 162 of FIG. 1. The data package 162B includes an application 304. According to one implementation, the command 106 instructs the data processing circuitry 157 to install the application 304 at the mobile device 102. As a non-limiting example, the data processing circuitry 157 initiates an installation operation using application data associated with the application 304. Upon completion of the installation operation, a user of the mobile device 120 can open the application 304 and use features of the application in an environment associated with the coverage area 202.

Figure 3C:
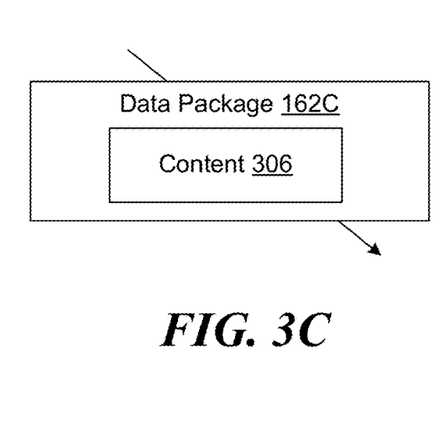

Referring to FIG. 3C, a particular implementation of a data package 162C is shown. The data package 162C corresponds to the data package 162 of FIG. 1. The data package 162C includes content 306. The content 306 can include video content, audio content, text content, application content, etc. According to one implementation, the command 106 instructs the data processing circuitry 157 to display the content 306. As a non-limiting example, the content 306 can include encoded video. The data processing circuitry 157 decodes the encoded video to generate decoded video, and the decoded video is displayed at a display screen (not shown) of the mobile device 120. According to another implementation, the command 106 instructs the data processing circuitry 157 to send the content 306 to an application. As a non-limiting example, one or more applications, such as the application 304, are installed on the mobile device 120. The data processing circuitry 157 sends the content 306 to the application for execution. According to another implementation, the command 106 instructs the data processing circuitry 157 to store the content 306 in the memory 122. According to some implementations, the data package 162 includes multiple items. As a non-limiting example, the data package 162 can include the configuration setting 302, the application 304, and the content 306.

The techniques described with respect to FIGS. 1-3C enable efficient data package delivery to an end-user of the mobile device 120 and reduced set-up time associated with the data package. For example, because the access point 110 transmits the data package identifier 108 to the mobile device 120 in response to receiving the mobile device identifier 152, the mobile device 120 can identify the data package 162 without an end-user having to manually access a data package repository. Additionally, the end-user of the mobile device 120 does not need foreknowledge of the data package 162 and the location of the data package 162 in order for the mobile device 120 to receive the data package 162. As a result, the data package 162 is more efficiently delivered to the mobile device 120 (compared to a manual process).

As a non-limiting example, content illustrating how to operate a particular tool can be delivered in an efficient manner to a mechanic operating the mobile device 120. To illustrate, the mechanic operating the mobile device 120 enters a manufacturing environment. Upon entering into a manufacturing environment, the mobile device 120 sends the mobile device identifier 152 to the access point 110, and the access point 110 determines that a particular tool is checked out to a user (e.g., the mechanic) of the mobile device 120. Based on the determination, the access point 110 sends the data package identifier 108 to the mobile device 120 to identify a data package (e.g., the data package 162) associated with particular tool. For example, data package 162 can include content (e.g., an instruction manual) for the particular tool. The mobile device 120 sends the data package request 158 (including the data package identifier 108) to the server 130, and the server 130 sends the data package 162 to the mobile device 120. As a result, the mechanic can view the instruction manual at the mobile device 120.

Figure 4:
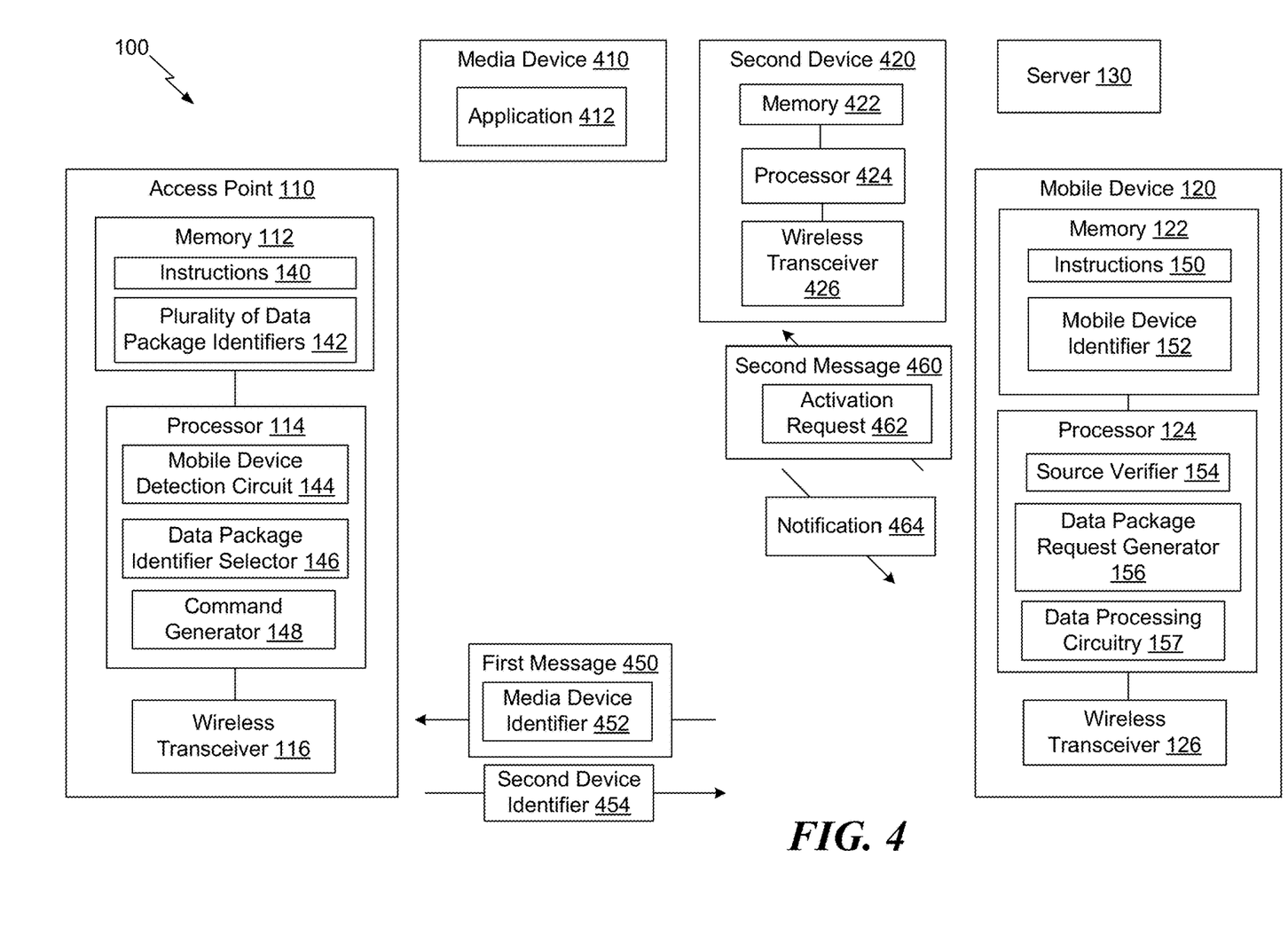
FIG. 4 is a diagram of a system that is operable to activate an application at a media device.

Referring to FIG. 4, a diagram of another implementation of the system 100 is shown. According to FIG. 4, the system 100 is operable to activate an application at a media device is shown. The system 400 includes the access point 110, the mobile device 120, the media device 410, and the second device 420. According to one implementation, the media device 410 is a kiosk in a manufacturing environment. For example, the media device 410 includes more computing power than the mobile device 120 and has a larger screen than the mobile device 120.

The mobile device 120 is configured to transmit a first message 450 to the access point 110. The first message requests activation of an application 412 at the media device 410. To illustrate, the processor 124 generates the first message 450 and includes a media device identifier 452 in the first message 450. According to one implementation, the media device identifier 452 is included in the data package 162 received from the server 130. The media device identifier 452 includes identification information associated with the media device 410 and identification information associated with the application 412. As a non-limiting example, the media device identifier 452 includes a product key of the media device 410. According to one implementation, the first message 450 includes credentials associated with the user of the mobile device 120. To illustrate the first message 450 can include security credentials of the user. The wireless transceiver 126 is configured to transmit the first message 450 to the access point 110 after generation of the first message 450. According to one implementation, the first message 450 is transmitted from the mobile device 120 to the access point 110 in response to a determination that the media device 410 is within a coverage area of the mobile device 120 (e.g., within the coverage area 202).

The wireless transceiver 116 is configured to receive the first message 450 from the mobile device 120. Upon reception of the media device identifier 452 in the first message 450, the processor 114 is configured to identify a device that is capable of activating the application 412 (e.g., identify a device that can activate applications stored at the media device 410). As a non-limiting example, the processor 114 determines that the second device 420 has the capability of activating the application 412. As a result, the processor 114 generates a second device identifier 454. The wireless transceiver 116 is configured to transmit the second device identifier 454 to the mobile device 120.

The wireless transceiver 126 is configured to receive the second device identifier 454 from the access point 110. Upon reception of the second device identifier 454, the processor 124 is configured to generate a second message 460 that requests the second device 420 to activate the application 412 at the media device 410. For example, an activation request 462 is included in the second message 460. The wireless transceiver 126 is configured to send the second message 460 to the second device 420. Different implementations of the second message 460 are described with respect to FIGS. 5A-5C.

Figure 5A:
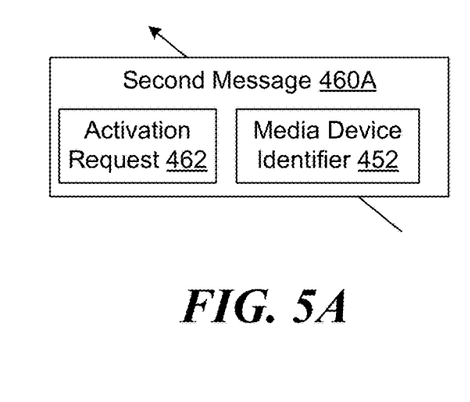
FIGS. 5A, 5B, and 5C illustrate different implementations of messages that include a request to activate applications at a media device.

Referring to FIG. 5A, a particular implementation of a second message 460A is shown. The second message 460A corresponds to the second message 460 of FIG. 4. The second message 460A includes the activation request 462 and the media device identifier 452. The media device identifier 452 identifies the media device 410, and the activation request 462 instructs the second device 420 to activate applications (e.g., the application 412) at the media device 410.

Figure 5B:
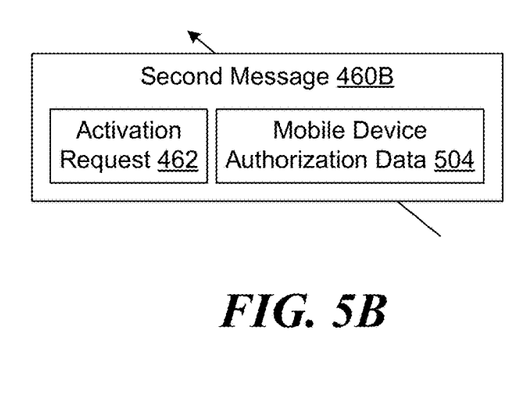

Referring to FIG. 5B, a particular implementation of a second message 460B is shown. The second message 460B corresponds to the second message 460 of FIG. 4. The second message 460B includes the activation request 462 and mobile device authorization data 504. The mobile device authorization data 504 indicates that the mobile device 120 is authorized to request activation of the application 412, and the activation request 462 instructs the second device 420 to activate the application 412.

Figure 5C:
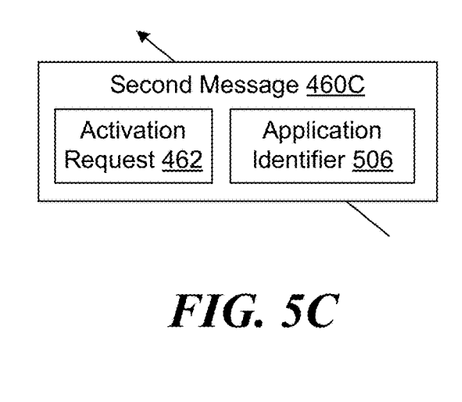

Referring to FIG. 5C, a particular implementation of a second message 460C is shown. The second message 460C corresponds to the second message 460 of FIG. 4. The second message 460C includes the activation request 462 and an application identifier 506. The application identifier 506 identifies the application 412 to be activated, and the activation request 462 instructs the second device 420 to activate the application 412. According to some implementations, the second message 460 includes the activation request 462, the media device identifier 452, the mobile device authorization data 504, the application identifier 506, or a combination thereof.

The second device includes a memory 422, a processor 424 coupled to the memory 422, and a wireless transceiver 426 coupled to the processor 424. Upon reception of the second message 460, the processor 424 is configured to activate the application 412 at the media device 410. In response to activation of the application 412, the processor 424 is configured to generate a notification 464 indicating that the application 412 has been activated. The wireless transceiver 426 is configured to transmit the notification 464 to the mobile device 120.

Thus, the techniques described with respect to FIGS. 4-5C enable the mobile device 120 to initiate activation of the application 412 if a user of the mobile device 120 does not have foreknowledge of the device that can activate the application 412. For example, by sending the media device identifier 452 to the access point 110, the access point 110 indicates, to the mobile device 120, the device (e.g., the second device 420) that is capable of activating the application 412.

As a non-limiting example, the application 412 can be an instructional video displayed at the media device 410. The instructional video details how to use a particular piece of manufacturing equipment. According to the non-limiting example, the second device 420 is a video server that is configured to activate the instructional video at the media device 410. If a user of the mobile device 120 lacks the foreknowledge that the second device 420 is configured to activate the instructional video, the mobile device 120 sends the media device identifier 452 (of the media device 410) to the access point 110, and the access point 110 indicates (to the mobile device 120 using the second device identifier 454) that the second device 420 is configured to operate the media device 410. Based on the indication, the mobile device 120 requests the second device 420 to play the instructional video.

Figure 6:
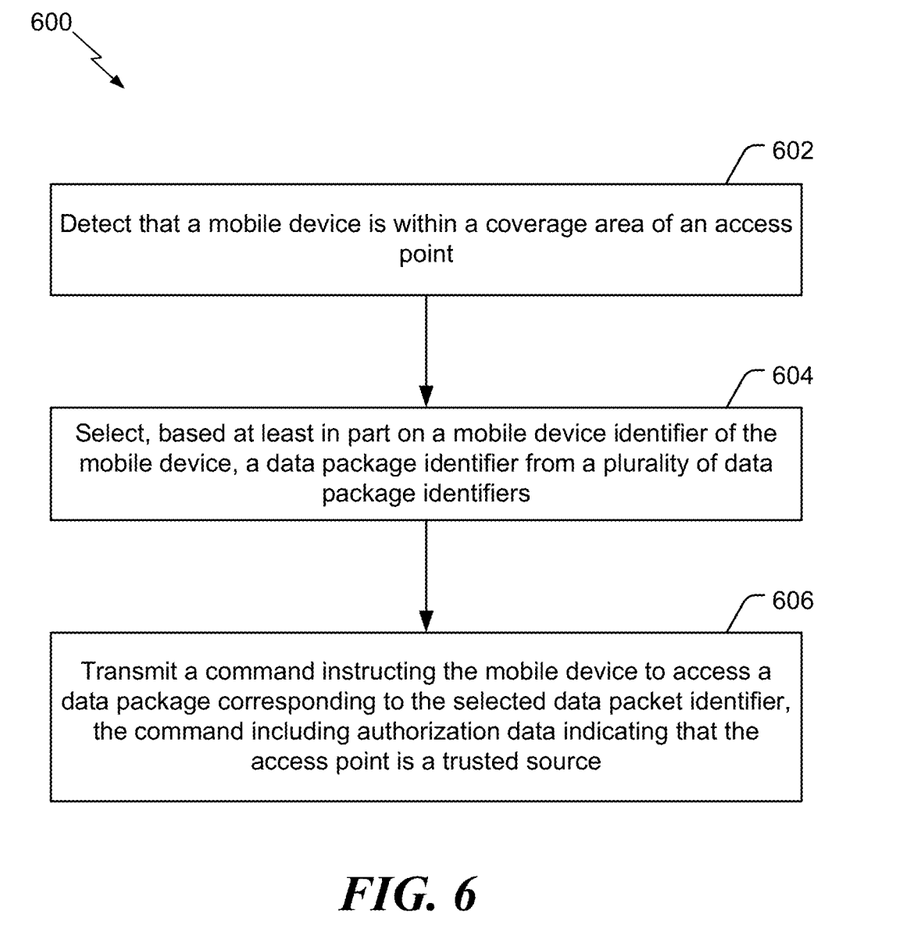
FIG. 6 is a flowchart of a method for enabling a mobile device to dynamically access data packets.

Referring to FIG. 6, a flowchart illustrating a method 600 for enabling data package access for a mobile device is shown. The method 600 is performed by the access point 110 of FIG. 1.

The method 600 includes detecting that a mobile device is within a coverage area of a wireless transceiver, at 602. For example, referring to FIGS. 1-2, the access point 110 detects that the mobile device 120 is within the coverage area 202 of the wireless transceiver 116 in response to receiving the mobile device identifier 152.

The method 600 also includes selecting, based at least in part on a mobile device identifier of the mobile device, a data package identifier from a plurality of data package identifiers, at 604. For example, referring to FIG. 1, the data package identifier selector 146 selects the data package identifier 108 from the plurality of data package identifiers 142 stored at the memory 112. Selection of the data package identifier 108 is based on the mobile device identifier 152. For example, the data package identifier 108 identifies the data package 162 to be used by the mobile device 120 indicated in the mobile device identifier 152.

The method 600 also includes transmitting a command instructing the mobile device to access a data package corresponding to the selected data packet identifier, at 606. The command includes authorization data that indicates that the access point is a trusted source. For example, referring to FIG. 1, the access point 110 transmits the command 106 to the mobile device 120. The command 106 instructs the mobile device 120 to access the data package 162 corresponding to the data package identifier 108.

Figure 7:
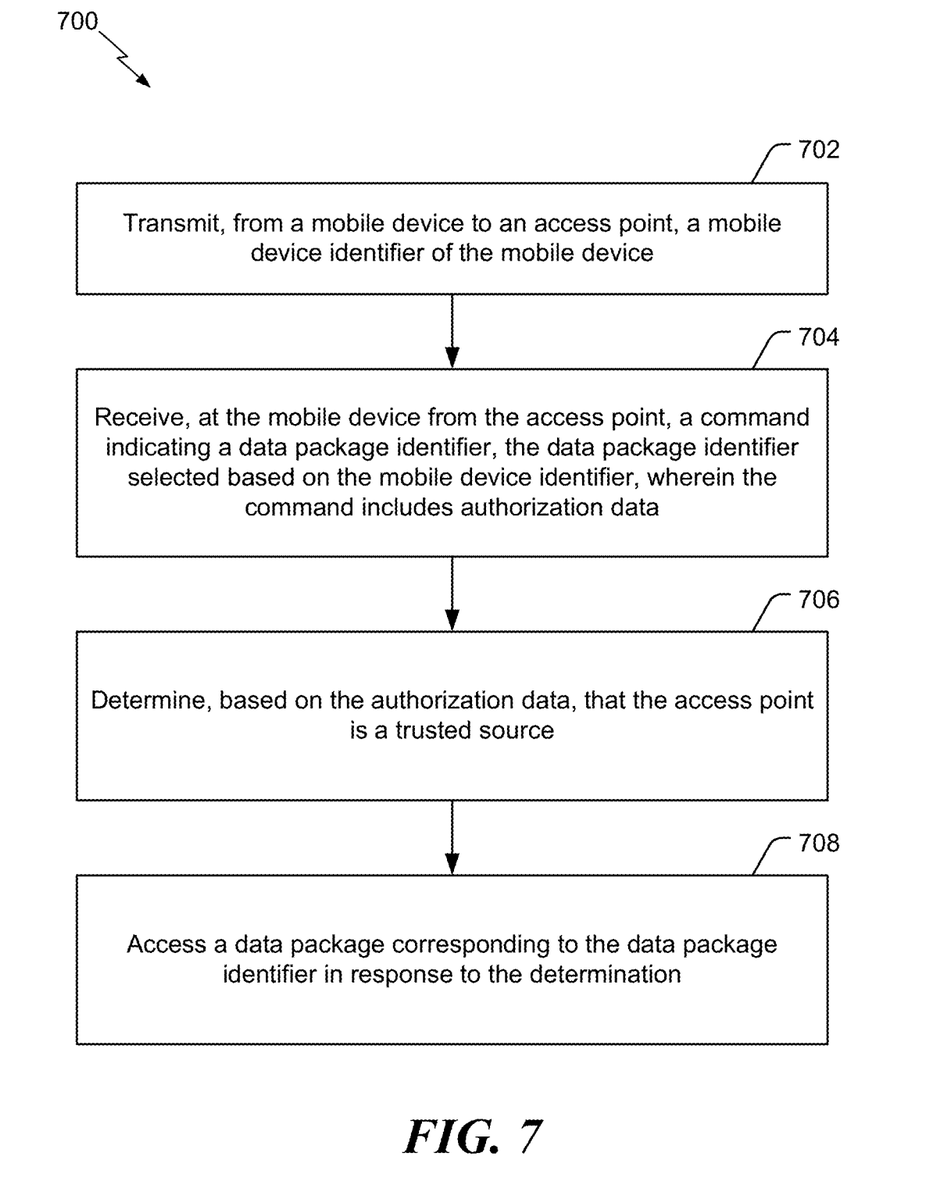
FIG. 7 is a flowchart of another method for enabling a mobile device to dynamically access data packets.

Referring to FIG. 7, a flowchart illustrating another method 700 for enabling data package access for a mobile device is shown. The method 700 is performed by the mobile device 120 of FIG. 1.

The method 700 includes transmitting, from a mobile device to an access point, a mobile device identifier of the mobile device, at 702. For example, referring to FIG. 1, the mobile device 120 transmits the mobile device identifier 152 to the access point 110.

The method 700 also includes receiving, at the mobile device from the access point, a command indicating a data package identifier, at 704. The data package identifier is selected based on the mobile device identifier, and the command includes authorization data. For example, referring to FIG. 1, the mobile device 120 receives the command 106 from the access point 110. The command 106 indicates the data package identifier 108 that is selected based on the mobile device identifier 152, and the command 106 includes the authorization data 109.

The method 700 also includes determining, based on the authorization data, that the access point is a trusted source, at 706. For example, referring to FIG. 1, the source verifier 154 determines that the access point 110 is a trusted source based on the authorization data 109.

The method 700 also includes accessing a data package corresponding to the data package identifier in response to the determination, at 708. For example, referring to FIG. 1, the mobile device 120 accesses the data package 162 from the server 130 in response to determining that the access point 110 is a trusted source.

According to one implementation, the method 700 also includes transmitting, from the mobile device to the access point, a first message requesting activation of an application at a media device. The message includes a media device identifier of the media device. The method 700 also includes receiving, at the mobile device from the access point, an identifier of a second device that is configured to activate the application at the media device. The method 700 also include sending, from the mobile device to the second device, a second message requesting activation of the application at the media device. The second message includes at least one of the media device identifier, mobile device authorization data that indicates the mobile device is authorized to access the application, or an application identifier of the application.

The methods 600, 700 of FIGS. 6-7 enable efficient data package delivery to an end-user of the mobile device 120 and reduced set-up time associated with the data package. For example, because the access point 110 transmits the data package identifier 108 to the mobile device 120 in response to receiving the mobile device identifier 152, the mobile device 120 can identify the data package 162 without an end-user having to manually access a data package repository. Additionally, the end-user of the mobile device 120 does not need foreknowledge of the data package 162 and the location of the data package 162 in order for the mobile device 120 to receive the data package 162. As a result, the data package 162 is more efficiently delivered to the mobile device 120 (compared to a manual process).

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
a processor of a wireless transceiver, the processor configured to:
  receive a device identifier from a mobile device in a coverage area of the wireless transceiver, wherein the device identifier includes a product key for the mobile device and a credential key for an end-user associated with the mobile device;
  determine that an item different than the mobile device is associated with the end-user;
  select, based on the credential key, particular data associated with the item, the particular data including instructions for operation of the item; and
  select, based on the product key, a data package identifier from a plurality of data package identifiers, the data package identifier identifying a data package associated with the particular data that is usable by the mobile device; and
the wireless transceiver configured to transmit a command instructing the mobile device to access the data package from a server, the command including authorization data indicating that the processor is a trusted source.

2. The device of claim 1, wherein the data package includes a configuration setting, and wherein the command further instructs the mobile device to update a configuration of the mobile device based on the configuration setting.

3. The device of claim 1, wherein the data package includes an application, and wherein the command further instructs the mobile device to install the application at the mobile device.

4. The device of claim 1, wherein the data package includes content, and wherein the command further instructs the mobile device to at least one of display the content, send the content to an application, or store the content in a memory.

5. The device of claim 1, wherein the wireless transceiver is further configured to:
receive a first message from the mobile device requesting activation of an application at a media device; and
in response to receiving the first message, transmit an identifier of a second device to the mobile device, the second device configured to activate the application at the media device.

6. The device of claim 1, wherein the data package identifier is selected based at least in part on determining that the end-user has a level of security clearance that satisfies a security clearance threshold associated with the data package.

7. The device of claim 1, wherein the processor determines that the item is associated with the end-user by making a determination that item catalogue data indicates that the item is checked out to the end-user.

8. The device of claim 1, wherein the processor determines that the item is associated with the end-user by detection of the item within the coverage area of the wireless transceiver.

9. The device of claim 1, wherein the data package identifier is selected based at least in part on determining that the data package is associated with a model of the mobile device, a type of an operating system installed on the mobile device, a version of the operating system, a hardware specification of the mobile device, or a software specification of the mobile device.

10. A method comprising:
transmitting, from a mobile device to an access point, a mobile device identifier of the mobile device, wherein the mobile device identifier includes a product key for the mobile device and a credential key for an end-user associated with the mobile device;
receiving, at the mobile device from the access point, a command indicating a data package identifier of a data package, the data package selected by the access point based on a determination that an item different than the mobile device is associated with the end-user, based on the credential key, and based on the product key, wherein the data package is associated with the item includes instructions for operation of the item, and wherein the command includes authorization data; and
in response to a determination by the mobile device that the access point is a trusted source, accessing the data package corresponding to the data package identifier from a server.

11. The method of claim 10, further comprising:
transmitting, from the mobile device to the access point, a first message requesting activation of an application at a media device, the first message including a media device identifier of the media device;
receiving, at the mobile device from the access point, an identifier of a second device configured to activate the application at the media device; and
sending, from the mobile device to the second device, a second message requesting activation of the application at the media device, the second message including at least one of the media device identifier, mobile device authorization data indicating that the mobile device is authorized to access the application, or an application identifier of the application.

12. The method of claim 11, wherein the first message is transmitted from the mobile device to the access point in response to determining that the media device is within a coverage area of the mobile device.

13. The method of claim 11, further comprising receiving a notification from the second device indicating that the application has been activated at the media device.

14. A computer-readable storage device storing instructions that, when executed by a processor, cause the processor to perform operations comprising:
receiving a device identifier from a mobile device in a coverage area of a wireless transceiver, wherein the device identifier includes a product key for the mobile device and a credential key for an end-user associated with the mobile device;
determining that an item different than the mobile device is associated with the end-user;
selecting, based on the credential key, particular data associated with the item, the particular data including instructions for operation of the item;
selecting, based on the product key, a data package identifier from a plurality of data package identifiers, the data package identifier identifying a data package associated with the particular data that is usable by the mobile device; and
initiating transmission of a command instructing the mobile device to access the data package from a server, the command including authorization data indicating that the processor is a trusted source.

15. The computer-readable storage device of claim 14, wherein the data package includes a configuration setting, and wherein the command further instructs the mobile device to update a configuration of the mobile device based on the configuration setting.

16. The computer-readable storage device of claim 14, wherein the data package includes an application, and wherein the command further instructs the mobile device to install the application at the mobile device.

17. The computer-readable storage device of claim 14, wherein the data package includes content, and wherein the command further instructs the mobile device to at least one of display the content, send the content to an application, or store the content in a memory.

18. The computer-readable storage device of claim 14, wherein the data package identifier is selected based at least in part on determining that the end-user has a level of security clearance that satisfies a security clearance threshold associated with the data package.

19. The computer-readable storage device of claim 14, wherein the determining that the item is associated with the end-user comprises determining from an item catalogue that item catalogue data indicates that the item is checked out to the end-user.

20. The computer-readable storage device of claim 14, wherein the product key indicates one or more of a model of the mobile device, a type of an operating system installed on the mobile device, a version of the operating system, a hardware specification of the mobile device, or a software specification of the mobile device.

* * * * *